US007604177B2

(12) United States Patent
Konuma et al.

(10) Patent No.: US 7,604,177 B2
(45) Date of Patent: Oct. 20, 2009

(54) CONTACTLESS DATA CARRIER, INTERROGATOR, CONTACTLESS DATA CARRIER SYSTEM, AND METHOD OF ACQUIRING DATA

(75) Inventors: Ryohei Konuma, Osaka (JP); Fujio Deguchi, Tokyo (JP); Saburo Ito, Kanagawa (JP)

(73) Assignees: Oki Electric Industry Co., Ltd., Tokyo (JP); Oki Communications Systems Co., Ltd., Saitama (JP)

( * ) Notice: Subject to any disclaimer, the term of this patent is extended or adjusted under 35 U.S.C. 154(b) by 569 days.

(21) Appl. No.: 11/127,107

(22) Filed: May 12, 2005

(65) Prior Publication Data
US 2005/0252979 A1 Nov. 17, 2005

(30) Foreign Application Priority Data
May 14, 2004 (JP) ............................. 2004-144926

(51) Int. Cl.
G06K 19/06 (2006.01)
H04Q 5/22 (2006.01)
G08B 13/14 (2006.01)
G08B 1/08 (2006.01)

(52) U.S. Cl. ...................... 235/492; 340/10.1; 340/10.5; 340/10.51; 340/10.3; 340/572.1; 340/572.4; 340/539.1; 340/539.16

(58) Field of Classification Search ................. 235/492, 235/487, 493; 340/10.1, 10.5, 10.51, 10.3, 340/572.1, 572.4, 539.16
See application file for complete search history.

(56) References Cited

U.S. PATENT DOCUMENTS 7,061,380 B1* 6/2006 Orlando et al. .......... 340/572.1

2003/0014176 A1* 1/2003 Levine ..................... 701/70
2003/0030565 A1* 2/2003 Sakatani et al. ........... 340/679
2005/0216220 A1* 9/2005 Kim ......................... 702/130

FOREIGN PATENT DOCUMENTS

| JP | 62-91266 U | 6/1987 |
| JP | 5-90965 | 4/1993 |
| JP | 8-125536 | 5/1996 |
| JP | 10-289297 | 10/1998 |
| JP | 2001-307268 | 11/2001 |
| JP | 2002-353811 | 12/2002 |

OTHER PUBLICATIONS

Japanese Office Action, dated Sep. 9, 2008, Issued in Japanese Patent Application No. 2008-003622.

* cited by examiner

Primary Examiner—Daniel Walsh
Assistant Examiner—Tae W Kim
(74) Attorney, Agent, or Firm—Venable LLP; Michael A. Sartori; Yao Wang

(57) ABSTRACT

A contactless data carrier has a measurement port receiving an external signal to be compared, a threshold generator that generates different threshold values, a comparator that compares the external signal with the threshold values, and a controller that controls the variable threshold generator on command from an interrogator and returns the comparison results to the interrogator. The comparison results returned to the interrogator may be the results of the individual comparisons, or information derived from a threshold value at which the comparison result changes. The contactless data carrier is small, lightweight, and inexpensive, and can be used to perform an essentially unlimited variety of measurements by connecting suitable sensors to the measurement port.

9 Claims, 15 Drawing Sheets

CONTACTLESS DATA CARRIER, INTERROGATOR, CONTACTLESS DATA CARRIER SYSTEM, AND METHOD OF ACQUIRING DATA

BACKGROUND OF THE INVENTION

1. Field of the Invention

The present invention relates to a contactless data carrier and a contactless data carrier system used for measuring physical quantities.

2. Description of the Related Art

Contactless data carriers (sometimes referred to as transponders) and interrogators (sometimes referred to as readers) are now widely employed for simple data processing purposes in situations in which the small size, light weight, and low cost of the contactless data carriers offer significant advantages. In addition, contactless data carriers equipped with sensors are beginning to find uses in measurement systems. Japanese Patent Application Publication No. 10-289297, for example, discloses a contactless data carrier equipped with a built-in temperature sensor and pressure sensor for monitoring temperature and pressure inside an automobile tire.

A number of problems, however, arise when a contactless data carriers are equipped with sensors. One problem is that the advantages of low cost, small size, and light weight are apt to be lost. Aside from the added size, weight, and cost of the sensor itself, there are the power requirements of the sensor and its associated signal-processing circuitry, typically including an analog-to-digital converter. If these requirements surpass the power that can be supplied from the energy of the interrogator signal, the contactless data carrier must have a battery, but batteries are neither inexpensive nor small nor light in weight.

Another problem is that the contactless data carrier is limited by its built-in sensor or sensors to making particular measurements. The contactless data carrier manufacturer must therefore manufacture different types of contactless data carriers for different measurement applications.

One way to minimize the number of different types of contactless data carriers is to equip each contactless data carrier with only one sensor, but then when several physical quantities need to be measured at the same location, several contactless data carriers must be installed. This is inconvenient, and the interrogator must communicate with each contactless data carrier separately, which takes time and requires extra power.

If a single contactless data carrier is equipped with a plurality of sensors, its size, weight, and manufacturing cost increase considerably, while the range of applications in which the contactless data carrier can be efficiently employed becomes limited to applications requiring a specific set of measurements. Production volumes of such multi-sensor contactless data carriers are therefore comparatively small, making the contactless data carriers even more expensive to manufacture.

Moreover, there are practical limits on the number of built-in sensors that a contactless data carrier can have. Even putting two sensors into a contactless data carrier is often difficult.

There is accordingly a need for a small, lightweight, and inexpensive contactless data carrier that is adaptable to multiple types of measurements and can accommodate multiple sensors, for an interrogator that can take measurement data from this type of contactless data carrier, and for the associated system software and operating methods.

SUMMARY OF THE INVENTION

An object of the present invention is to measure physical quantities through a small, lightweight, and inexpensive contactless data carrier.

Another object of the invention is to enable a single contactless data carrier to make a substantially unlimited variety of measurements.

The invention provides a contactless data carrier having a measurement port receiving an external signal, a threshold generator for generating different threshold values, a comparator for comparing the external signal with the threshold values, and a controller controlling the threshold generator according to signals received from an interrogator and returning comparison results to the interrogator. The comparison results returned to the interrogator may be the results of the individual comparisons, or information derived from a threshold value at which the comparison result changes.

The invention also provides an interrogator that commands the controller in the contactless data carrier to have the comparator execute the repeated comparisons with different threshold values, receives the comparison results, and uses the comparison results to obtain the value of a physical quantity.

The invention further provides a contactless data carrier system including the above contactless data carrier and interrogator, and a signal source such as a sensor connected to the measurement port of the contactless data carrier.

In addition, the invention provides a method of acquiring data from the invented contactless data carrier. The method includes sending the contactless data carrier a command to have the comparator execute repeated comparisons with different threshold values, recognizing a boundary threshold value at which the comparison result changes, and converting the boundary threshold value to the value of a physical quantity.

The invention also provides machine-readable media storing code executable by a computing device to acquire data from the invented contactless data carrier by the invented method. The code includes a program installed in the controller in the contactless data carrier, and another program installed in the interrogator.

The invented contactless data carrier is small, lightweight, and inexpensive because its components are small, lightweight, and inexpensive, and do not consume so much power as to require a battery.

The variety of measurements that can be made with the contactless data carrier is substantially unlimited because any physical quantity can be measured by connecting a suitable sensor to the measurement port.

DETAILED DESCRIPTION OF THE INVENTION

Figure 1:
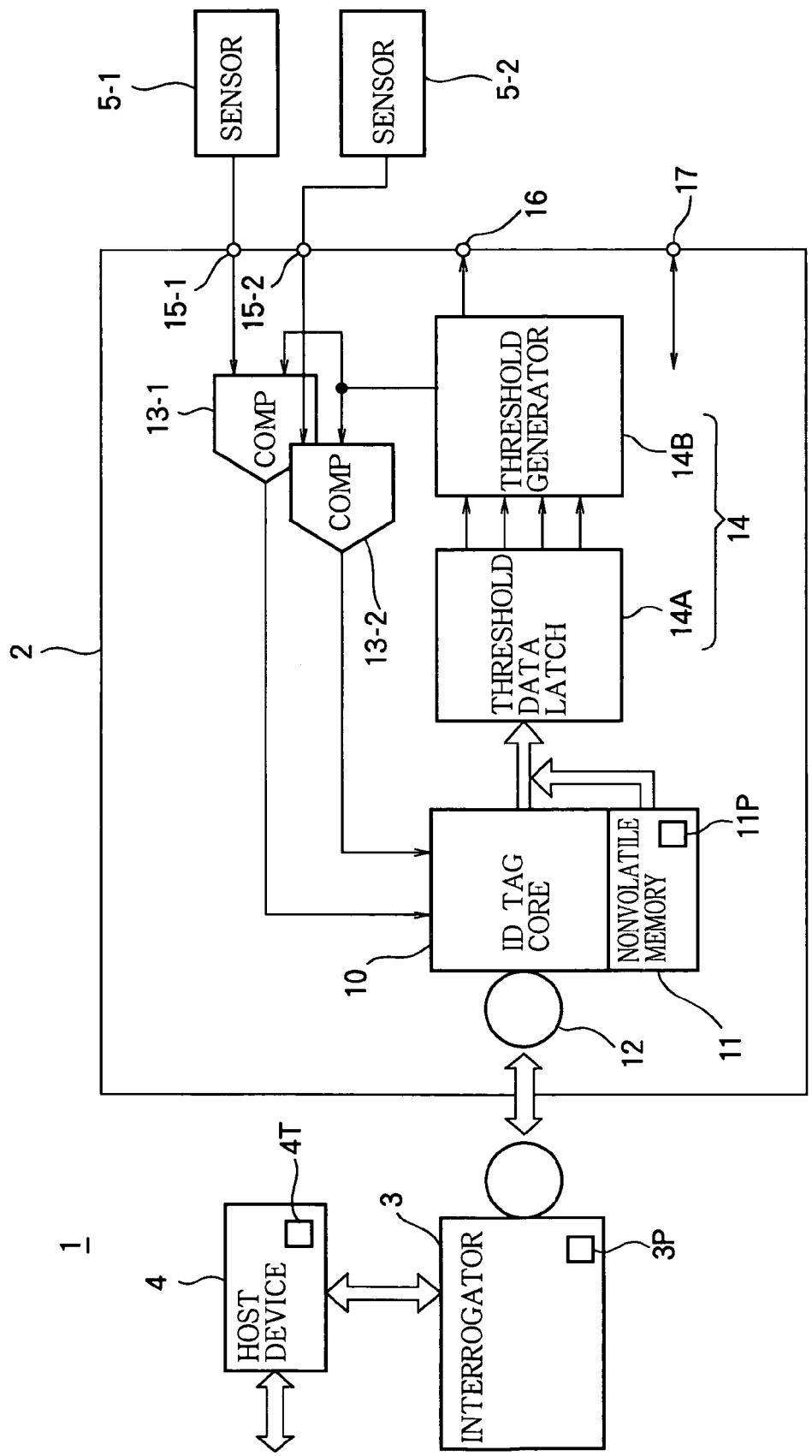
FIG. 1 is a block diagram of a contactless data carrier system according to a first embodiment of the invention.

Embodiments of the invention will now be described with reference to the attached drawings, in which like elements are indicated by like reference characters.

First Embodiment

Referring to FIG. 1, the first embodiment is a contactless data carrier system 1 comprising a contactless data carrier 2, an interrogator 3, and a host device 4. The contactless data carrier 2 is connectable to one or more sensors: in the example shown, the contactless data carrier 2 is connected to two sensors 5-1 and 5-2.

The contactless data carrier 2 and the interrogator 3 may be installed in fixed locations or may be portable from one location to another. In the following description it will be assumed that at least one of the contactless data carrier 2 and interrogator 3 is portable. The number of contactless data carriers 2 capable of communicating with the interrogator 3 may be just one, or more than one; it will be assumed below that there are more than one contactless data carriers 2 capable of communicating with the interrogator 3. The connections between the contactless data carrier 2 and the sensors 5-1, 5-2 may be permanent or temporary: for example, the connections may be changed by a human operator each time a different measurement is required.

The contactless data carrier 2 may be, for example, a type of radio-frequency identification tag (RFID tag). The contactless data carrier 2 comprises an ID tag core 10, a nonvolatile memory 11, an antenna 12, one or more analog comparators (two analog comparators 13-1, 13-2 are shown in FIG. 1, labeled COMP), a variable threshold section 14, a number of measurement ports 15-1, 15-2 matching the number of analog comparators 13-1, 13-2, an external expansion terminal 16, and an external input/output (I/O) terminal 17. For simplicity, each measurement port is shown as a single input terminal; in practice, a single measurement port may comprise two input terminals, such as a signal terminal and a ground return terminal, as will be shown in the third embodiment.

The ID tag core 10 comprises, for example, a central processing unit (CPU), a radio-frequency unit, and other well-known circuits that execute the processing performed by RFID tags in general. The ID tag core 10 demodulates the wireless signal acquired by the antenna 12 to a serial digital signal (an interrogation signal), analyzes the serial digital signal (or parallel data resulting from serial/parallel conversion of the digital signal) to obtain the content of an interrogation from the interrogator 3, executes processes responsive to the interrogation, generates a response signal (comprising, for example, parallel data), modulates the response signal (or a serial signal resulting from parallel/serial conversion of the response signal) onto an outgoing wireless signal, and transmits this signal from the antenna 12. If the interrogation signal from the interrogator 3 requests measurement operations, the ID tag core 10 sets threshold data and collects measurement results as described below.

The ID tag core 10 also has a power supply unit that obtains the power necessary for operating the contactless data carrier 2 from the wireless signal received by the antenna 12, and supplies power to other parts of the contactless data carrier 2 through power supply lines not explicitly shown in FIG. 1.

The nonvolatile memory 11, which may be a ferroelectric random-access memory (FeRAM), for example, stores data such as an identifier (ID) assigned to the contactless data carrier 2 and programs executed by the CPU in the ID tag core 10. One of the programs is a measurement mode program 11P. The nonvolatile memory 11 may also store threshold data as described below.

The antenna 12 is, for example, a combined transmitting-receiving antenna (the transmitting and receiving antennas may also be separate). The antenna 12 is preferably a resonant antenna with an antenna coil that resonates at a predetermined frequency with the capacitive component of the circuit to which it is connected, facilitating the efficient extraction of the energy needed to operate the contactless data carrier 2.

Each of the analog comparators 13-1, 13-2 comprises, for example, a Schmidt-trigger circuit, or any other type of circuit that compares an analog voltage signal obtained from a measurement port 15-1 or 15-2 with a threshold voltage supplied by the variable threshold section 14 and outputs a binary logic signal indicating the result. Throughout the following description, it will be assumed that the result is a logic '1' when the sensor signal voltage exceeds the threshold voltage, and a logic '0' when the sensor signal voltage is equal to or less than the threshold voltage.

The sensors 5-1 and 5-2 may be sensors of any type that provides analog voltage output and can be connected to the measurement ports 15-1, 15-2. Connectable types of sensors include, for example, temperature sensors, electrical conductivity sensors, strain sensors, pressure sensors, chemical concentration sensors, moisture sensors, and electrical resistance sensors. Each sensor 5-1 and 5-2 preferably has a built-in amplifier or attenuator for dynamic range adjustment.

The variable threshold section 14 provides the analog comparators 13-1, 13-2 with threshold voltages (also referred to below as threshold values) responsive to threshold data supplied by the ID tag core 10. The variable threshold section 14 includes a threshold data latch 14A that temporarily stores the threshold data and a threshold generator 14B that generates the threshold voltages.

Figure 2:
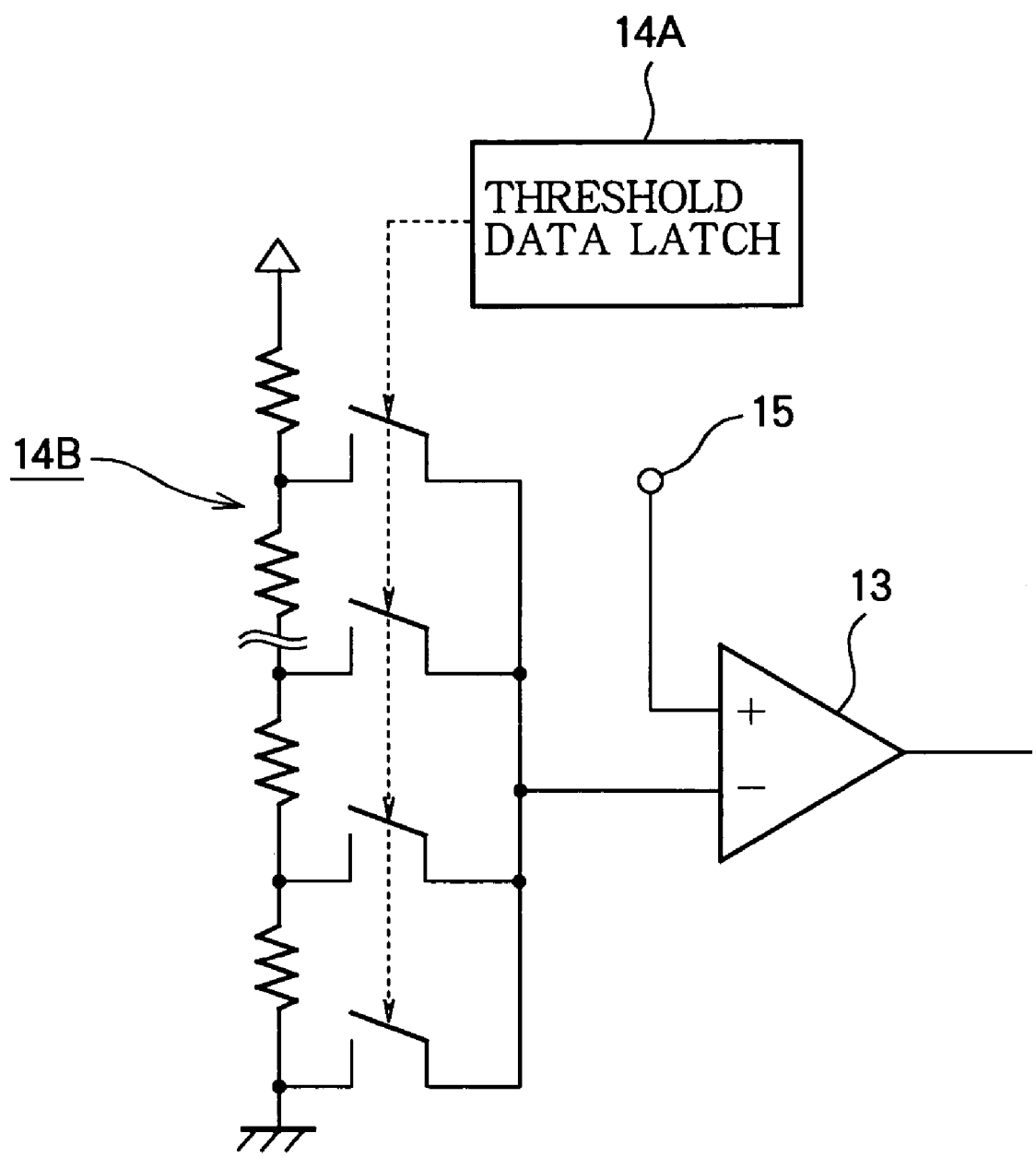
FIG. 2 is a circuit diagram showing part of the variable threshold section in FIG. 1.

The threshold generator 14B has the structure shown in FIG. 2, comprising a string of resistors connected in series between a power supply node and a ground node. These resistors divide the power supply voltage to generate threshold voltages varying in unit increments from ground level to a level one unit below the power supply level. The threshold generator 14B also includes switches, controlled by the threshold data stored in the threshold data latch 14A, that select one of the threshold voltage levels and supply the selected threshold voltage level to the inverting input terminal of each analog comparator. (The analog comparator 13 in FIG. 2 represents either analog comparator 13-1 or 13-2 in FIG. 1.) The non-inverting input terminal of the analog comparator receives a sensor signal from a measurement port 15 (representing either measurement port 15-1 or 15-2 in FIG. 1).

One of the threshold voltage levels generated by the threshold generator 14B is also output at the external expansion terminal 16 in FIG. 1 as a reference voltage for external testing or calibration.

The external input/output terminal 17 enables the data and programs stored in the nonvolatile memory 11 to be written and read externally through a wired connection, so that the nonvolatile memory 11 can be programmed from an external device.

The ID tag core 10 and the nonvolatile memory 11 in the contactless data carrier 2 are integrated into a single semiconductor chip. The threshold data latch 14A, threshold generator 14B, and analog comparators 13-1, 13-2 are formed on separate semiconductor chips.

The interrogator 3 has a conventional hardware structure, not shown in detail in FIG. 1. At the direction of the host device 4, to which the interrogator 3 is connected by a wired or wireless connection, the interrogator 3 sends the contactless data carrier 2 modulated wireless interrogation signals. The interrogator 3 also receives modulated wireless response signals from the contactless data carrier 2, demodulates the response signals to obtain the information included in therein, processes the information as necessary, and communicates relevant results to the host device 4. The exchange of interrogation signals and response signals between the interrogator 3 and contactless data carrier 2 is carried out according to or in compliance with a standard such as standard 15693 (Identification cards—Contactless integrated circuit(s) cards—Vicinity cards) of the International Standards Organization (ISO). The interrogator 3 has an internal processing unit (not shown) and operates by executing programs stored in an internal memory. One of these programs is a measurement mode program 3P including processor-executable code for operating in a first measurement mode and a second measurement mode, which will be described below.

The host device 4 is, for example, a personal computer that activates the interrogator 3, controls communication between the interrogator 3 and the contactless data carrier 2, and collects measurement data obtained from the contactless data carrier 2 by the interrogator 3. The host device 4 may in turn communicate with a higher-level device (not shown) by a wired or wireless connection.

The host device 4 has a memory with a table 4T of information listing the IDs of the contactless data carriers 2 with which the interrogator 3 is expected to communicate. For each ID, the table has a record indicating whether the contactless data carrier 2 can perform measurements, and if so, whether to use the first or second measurement mode. The first measurement mode is used the first time measurements are taken from the contactless data carrier 2 (including cases regarded as the first time because the information in the table 4T has been cleared); the second measurement mode is used the second time and subsequently. For each measurement port, the record also indicates the type of measurement performed, the value corresponding to the minimum threshold value, and the size of the unit increments between successive threshold values. For a particular measurement port, for example, the record might indicate that the measurement port is connected to a temperature sensor, that the minimum threshold level corresponds to minus twenty degrees Celsius (−20° C.), and that the unit increment between successive threshold levels corresponds to 1° C., in which case the measurement has a precision of 1° C.

Next, the operations performed by the above devices to obtain measurement data will be described.

The interrogator 3 periodically broadcasts interrogation signals to ascertain whether any contactless data carrier 2 is present in its vicinity. When a response signal is returned in reply to the interrogation signal, the interrogator 3 informs the host device 4, giving the ID of the contactless data carrier 2, which is included in the response signal.

The host device 4 checks its table 4T to determine whether the contactless data carrier 2 is able to perform measurement operations. If the contactless data carrier 2 has measurement capabilities, that is, if any sensors are connected to its measurement ports, the host device 4 commands the interrogator 3 to start a measurement procedure, specifying the relevant measurement port or ports and indicating whether to use the first or second measurement mode. The interrogator 3 then starts the measurement mode program 3P shown in FIGS. 3A and 3B. When the host device 4 commands use of the first measurement mode, it also updates the relevant record stored in the table 4T to indicate that the second measurement mode is to be used the next time.

Figure 3A:
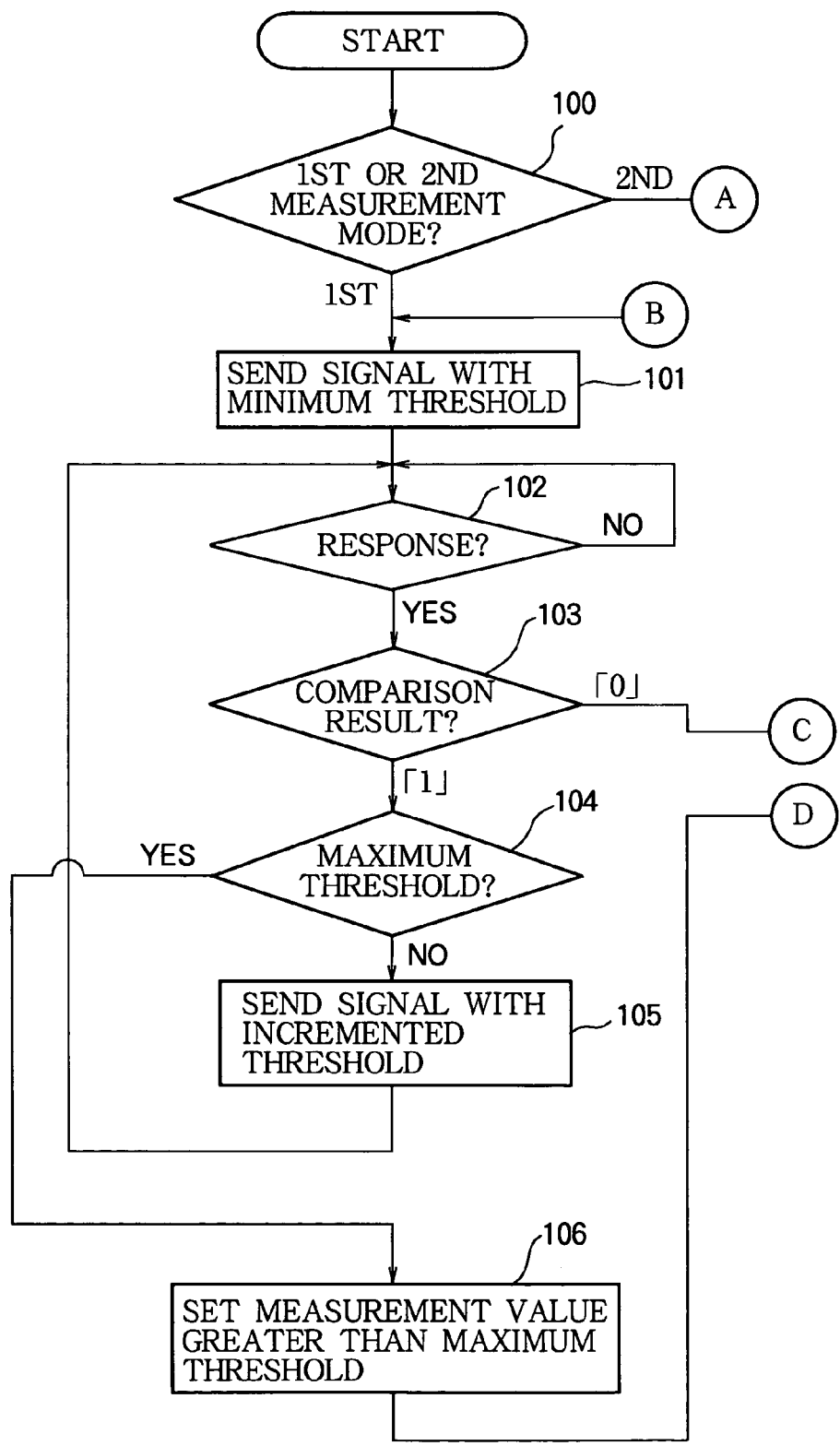
FIGS. 3A and 3B are a flowchart illustrating the operation of the interrogator in FIG. 1 in first and second measurement modes.

The measurement mode program 3P begins with a decision as to whether to operate in the first measurement mode or the second measurement mode (step 100 in FIG. 3A).

In the first measurement mode, the interrogator 3 generates an interrogation signal including the ID of the contactless data carrier 2, the port number of the first measurement port specified by the host device 4, threshold data (or an equivalent code) specifying the minimum threshold value to be used in the measurement, and a command to operate in the first measurement mode, sends the interrogation signal to the contactless data carrier 2 (step 101), and waits for a response from the contactless data carrier 2 (step 102).

The ID tag core 10 of the contactless data carrier 2 receives the interrogation signal, recognizes its own ID, stores an indication of the first measurement mode in the nonvolatile memory 11, sends the specified minimum threshold data to the threshold data latch 14A, and selects the analog comparator 13-1 or 13-2 connected to the relevant measurement port 15-1 or 15-2. The selected analog comparator compares the voltage at the measurement port with the minimum threshold value and outputs a comparison result ('0' or '1'). The ID tag core 10 generates a response signal including the comparison result and returns it to the interrogator 3.

If the comparison result is '0', the ID tag core 10 also stores threshold data indicating a threshold value less than the current threshold value by a predetermined amount in the nonvolatile memory 11 as initial threshold data to be used in the second measurement mode.

The interrogator 3 receives the response signal and determines whether the comparison result is '1' or '1' (step 103). If the comparison result is '1', the interrogator 3 checks whether the maximum threshold value has been reached (step 104). If the maximum threshold value has not been reached, the interrogator 3 generates an interrogation signal with threshold data (or an equivalent code) specifying a new threshold value higher than the current threshold value by one unit increment, sends this interrogation signal to the contactless data carrier 2 (step 105), and returns to step 102 to wait for another response from the contactless data carrier 2.

The loop from step 102 to step 105 continues until a '0' comparison result is obtained or the maximum threshold value is reached. If the maximum threshold value is reached, as detected in step 104, the interrogator 3 sets a value greater than the maximum threshold value by, for example, one-half unit increment as the measurement value (step 106), then proceeds to step 108 in FIG. 3B, described below.

If the comparison result is found to be '0' in step 103, the interrogator 3 sets a value less than the current threshold value by one-half unit increment as the measurement value (step 107 in FIG. 3B) and proceeds to step 108.

After a measurement value has been obtained for the current measurement port in step 106 or 107, in step 108 the interrogator 3 determines if any of the measurement ports specified by the host device 4 remain to be measured. If so, the process returns to step 101 to execute a measurement (by steps 101 to 107) on the next measurement port.

When measurement values have been obtained as described above from all specified measurement ports, the interrogator 3 completes the measurement process by sending an interrogation signal indicating the end of the measurement procedure to the contactless data carrier 2 (step 109), waiting for a response signal (step 110), and sending the measurement values obtained in steps 106 and 107 to the host device 4 (step 111). The host device 4 uses the information in table 4T to convert the measurement values received from the interrogator 3, which represent voltages output by the sensors, to measurement values indicating the quantity that has been measured, such as temperature, pressure, etc.

When the host device specifies the second measurement mode, after this is determined in step 100 in FIG. 3A, the interrogator 3 generates an interrogation signal including the ID of the contactless data carrier 2, the port number of the first measurement port specified by the host device 4, and a command to perform a measurement in the second measurement mode, sends the interrogation signal to the contactless data carrier 2 (step 112 in FIG. 3B), and waits for a response from the contactless data carrier 2 (step 113).

Figure 4A:
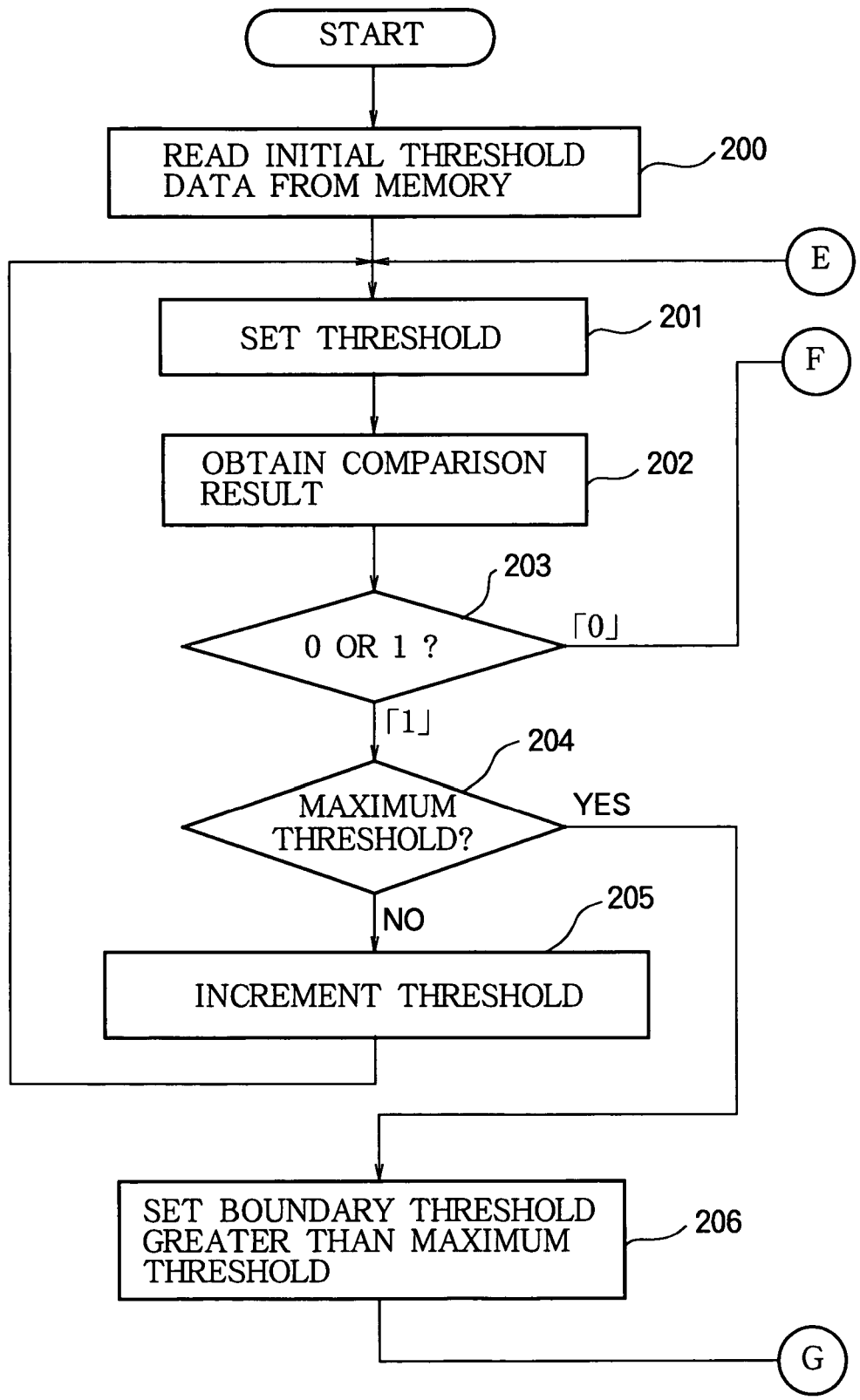
FIGS. 4A and 4B are a flowchart illustrating the operation of the contactless data carrier in FIG. 1 in the second measurement mode.

The ID tag core 10 in the contactless data carrier 2 receives the interrogation signal, recognizes its own ID, stores an indication of the second measurement mode in the nonvolatile memory 11, and executes the control process in FIGS. 4A and 4B (described below) to find a boundary threshold value at which the comparison result changes from '1' to '0', generates a response signal including the corresponding boundary threshold data, and sends the response signal to the interrogator 3. If the sensor signal is greater than the maximum threshold value, so that all comparison results are '1', the response signal includes a code indicating that this is the case.

Figure 3B:
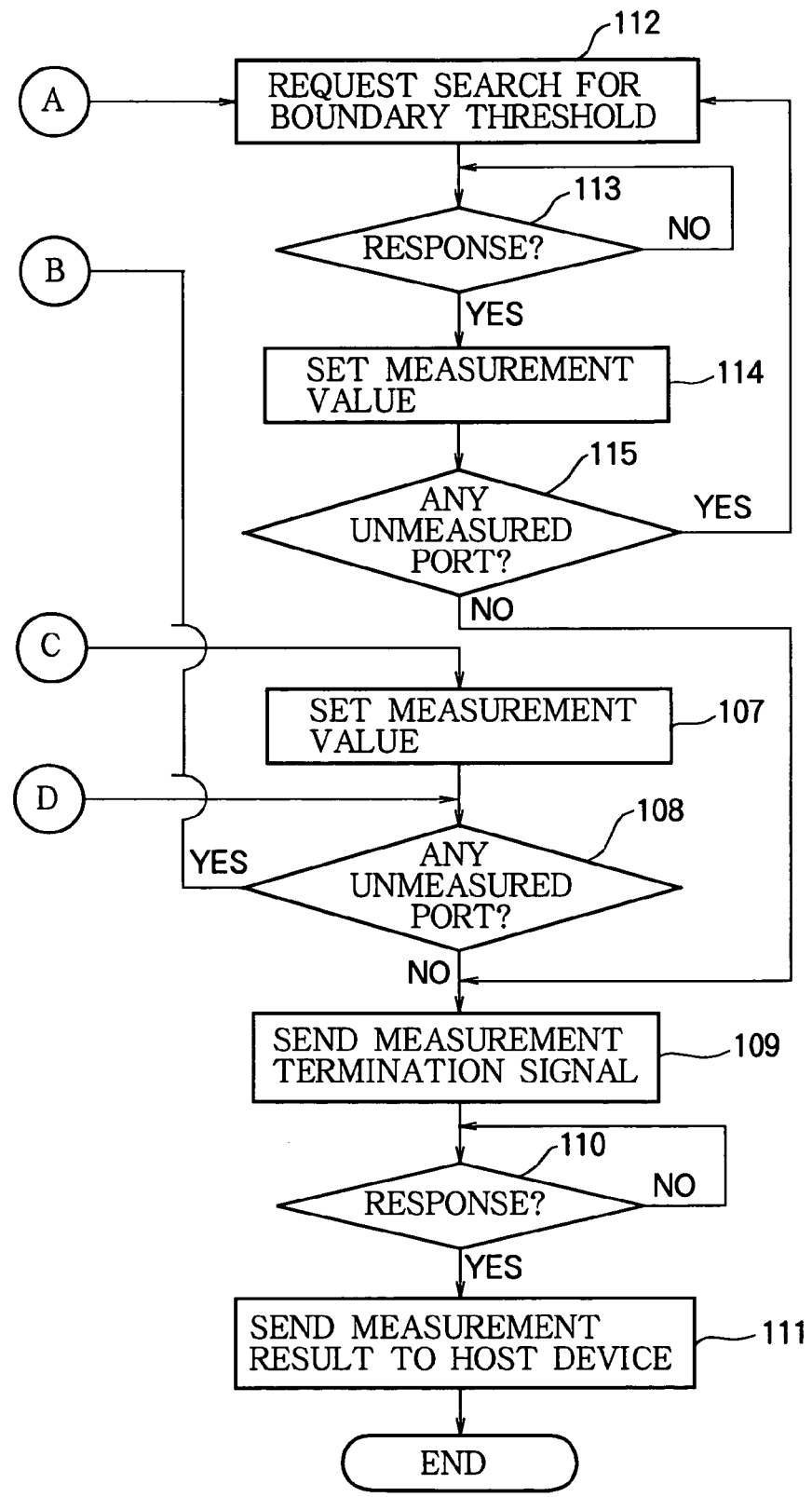

The interrogator 3 receives the above response signal and sets a value smaller by one-half unit increment than the boundary threshold data as the measurement value (step 114 in FIG. 3B). If the response signal indicates that the sensor signal is greater than the maximum threshold value, the interrogator 3 sets a value larger than the maximum threshold value by, for example, one-half unit increment as the measurement value.

Next, the interrogator 3 determines if any of the measurement ports specified by the host device 4 remain to be measured (step 115). If so, the process returns to step 112 to execute a measurement (by steps 112 to 114) on the next measurement port.

When measurement values have been obtained in step 114 from all specified measurement ports, the interrogator 3 proceeds to step 109 and completes the process as described above by sending the contactless data carrier 2 an interrogation signal indicating the end of the measurement procedure (step 109), waiting for a response signal (step 110), and sending the measurement results to the host device 4 (step 111).

As the preceding description shows, in the first measurement mode the entire measurement process is controlled by the interrogator 3, down to specification of the threshold data for each comparison, but in the second measurement mode much of the control is performed autonomously by the ID tag core 10 in the contactless data carrier 2. The control process carried out by the ID tag core 10 in the second measurement mode will now be described with reference to FIGS. 4A and 4B.

Upon receiving an interrogation signal instructing it to begin a measurement in the second measurement mode at a specified measurement port (sent in step 112 in FIG. 3B), the ID tag core 10 reads the initial threshold data for the specified measurement port from the nonvolatile memory 11 (step 200 in FIG. 4A), sets the threshold data in the threshold data latch 14A (step 201), obtains a comparison result from the analog comparator 13-1 or 13-2 connected to the specified measurement port (step 202), and determines whether the comparison result is '0' or '1' (step 203).

If the comparison result is '1', the ID tag core 10 checks whether the maximum threshold value has been reached (step 204). If the maximum threshold value has not been reached, the ID tag core 10 generates new threshold data specifying a new threshold value higher than the current threshold value by one unit increment (step 205), and returns to step 201 to repeat the comparison with the new threshold value. If the maximum value has been reached, the ID tag core 10 sets boundary threshold data greater than the maximum threshold data (step 206), or sets a code indicating that the comparison result is still '1' at the maximum threshold value, and proceeds to step 210 in FIG. 4B, which will be described below.

Figure 4B:
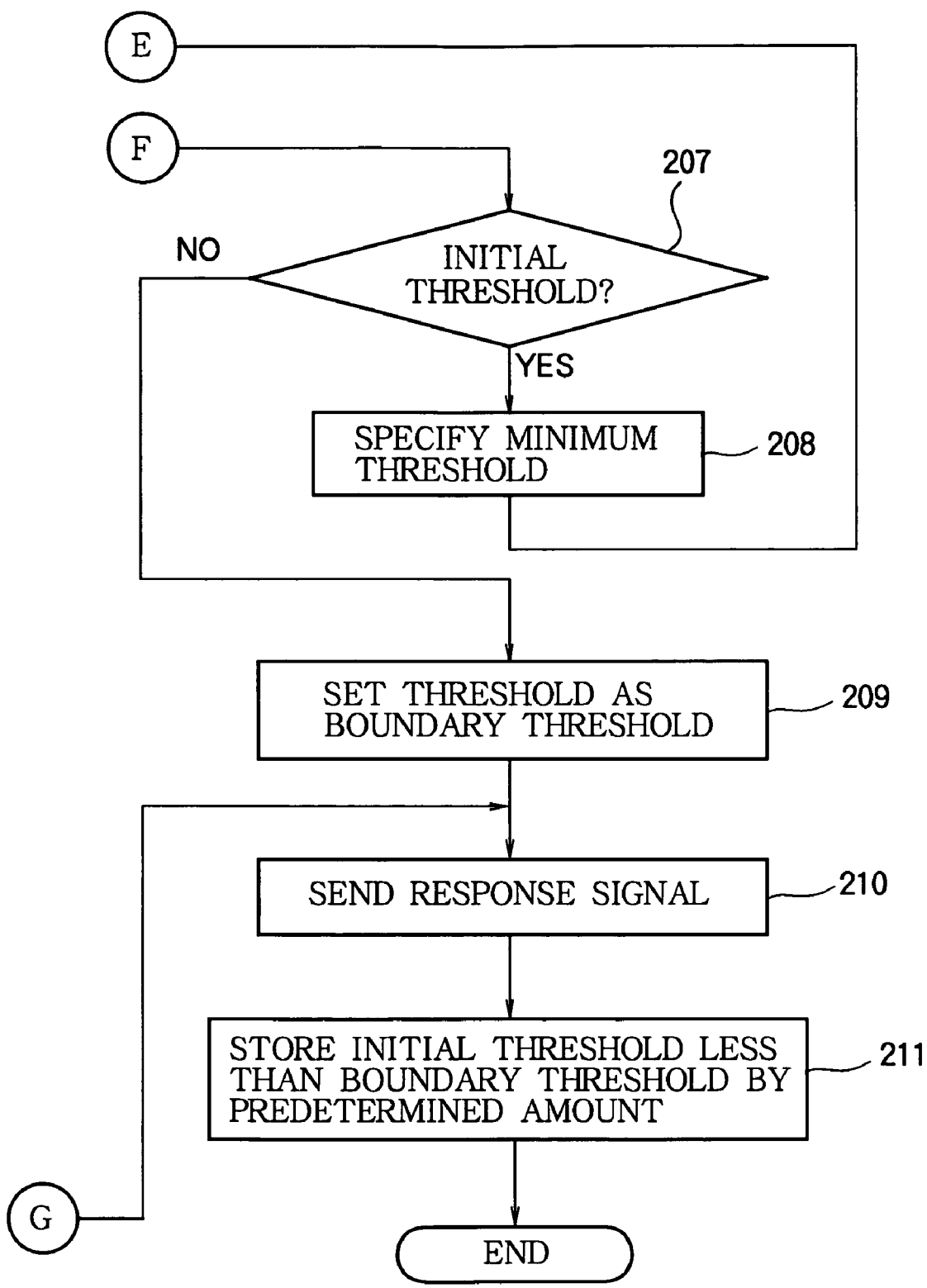

If the comparison result is '0' in step 203, the ID tag core 10 determines whether the threshold data are the initial threshold data read from the nonvolatile memory 111 (step 207 in FIG. 4B). If so, the ID tag core 10 reduces the threshold data to specify the minimum threshold value (step 208) and returns to step 201 to continue with further comparisons, starting from the minimum threshold value.

If the threshold data at which '0' is obtained as the comparison result are not the initial threshold data, the ID tag core 10 sets the threshold data as the boundary threshold data (step 209), sends the interrogator 3 a response signal including the boundary threshold data (step 210), and updates the initial threshold data stored in the nonvolatile memory 11 to new initial threshold data less than the boundary threshold data by a predetermined amount (step 211). The process now ends.

As noted above, the ID tag core also carries out the final step 211 in this process when a '0' comparison result is obtained in the first measurement mode.

The first embodiment produces the following effects.

To provide measurement capability, the only additional components needed in the contactless data carrier are the data threshold latch, the threshold generator, the analog comparators, and the measurement ports, none of which is costly or takes up significant space. The contactless data carrier is accordingly small and lightweight, and can be manufactured at a cost not greatly exceeding the cost of a conventional RFID tag.

In particular, no analog-to-digital converter as such is needed. Analog sensor output signals are converted to digital results by using a simple analog comparator.

Because of the small size of the analog comparators, a single contactless data carrier can easily accommodate a plurality of sensors, which is convenient when there are a plurality of physical quantities to be measured at the same location.

The contactless data carrier can be connected to any type of sensor that provides a voltage output signal. Accordingly, it is not necessary to manufacture different types of contactless data carriers to make different types of measurements, and sensors can be selected from a wide range of readily available devices.

The use of previous measurement results to set the initial threshold data in the second measurement mode shortens the measurement time by enabling the boundary threshold value to be found quickly when it is close to the value measured previously, which is often the case.

In a variation of the first embodiment, when a '0' result is obtained at the initial threshold level in the second measurement mode, the threshold level is reduced by a predetermined number of unit increments, instead of being reduced immediately to the minimum value, and the comparison is repeated. If the result is '0' again, the threshold level is reduced by the same number of unit increments again, and another comparison is made, this process continuing until a '1' result is obtained, or until a '0' result is obtained at the minimum threshold value. When a '1' result is obtained, the threshold value is increased in unit increments until a '0' result is obtained, at which point the boundary threshold value is set. If a '0' result is obtained at the minimum threshold value, the minimum threshold value is set as the boundary threshold value.

In another variation of the first embodiment, the analog comparators 13-1, 13-2 and the variable threshold section 14 are integrated into a single semiconductor chip, enabling the main components of the contactless data carrier 2 to be reduced to the antenna 12 and two semiconductor chips, thereby reducing the size, weight, and cost of the contactless data carrier still further.

In still another variation of the first embodiment, table 4T is stored in the interrogator 3, so that the interrogator 3 can decide for itself when to execute the measurement mode program 3P and whether to use the first or second measurement mode, and can convert the measurement values from sensor voltages to values expressing the physical quantity that has been measured.

Second Embodiment

Figure 5:
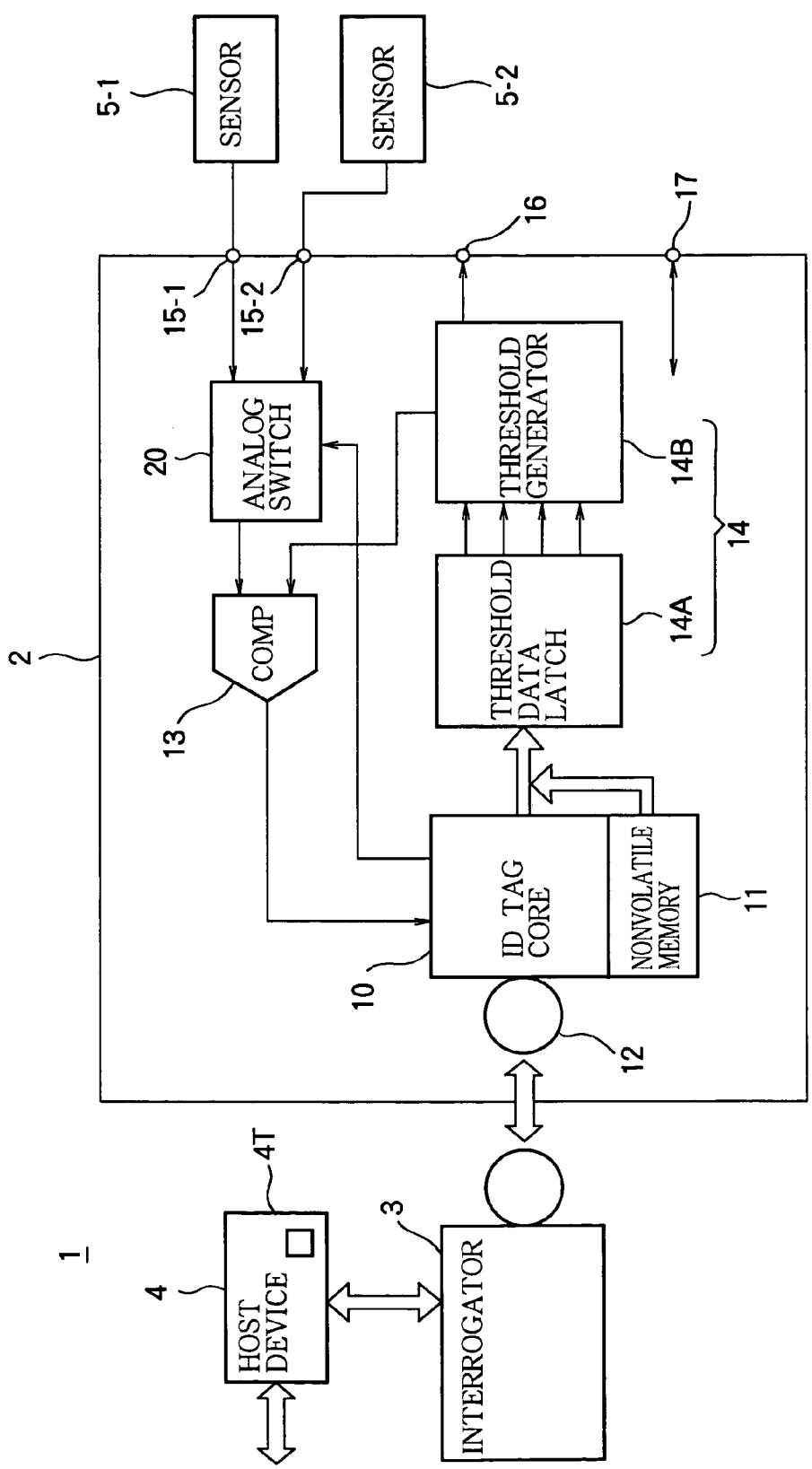
FIG. 5 is a block diagram of a contactless data carrier system according to a second embodiment of the invention.

Referring to FIG. 5, the second embodiment is identical to the first embodiment except that the multiple analog comparators of the first embodiment are replaced by a single common analog comparator 13. An analog switch 20 controlled by the ID tag core 10 selectively connects the common analog comparator 13 to any one of the measurement ports 15-1, 15-2.

The ID tag core 10 in the second embodiment performs the same control process as in the first embodiment, but instead of acquiring comparison results from different analog comparators connected to the different measurement ports, the ID tag core 10 controls the analog switch 20 so as to input the sensor signal from the port under measurement to the common analog comparator 13, and acquires all comparison results from the single analog comparator 13.

The second embodiment produces the same effects as the first embodiment, but requires less circuitry, especially when there are many measurement ports.

Third Embodiment

Figure 6:
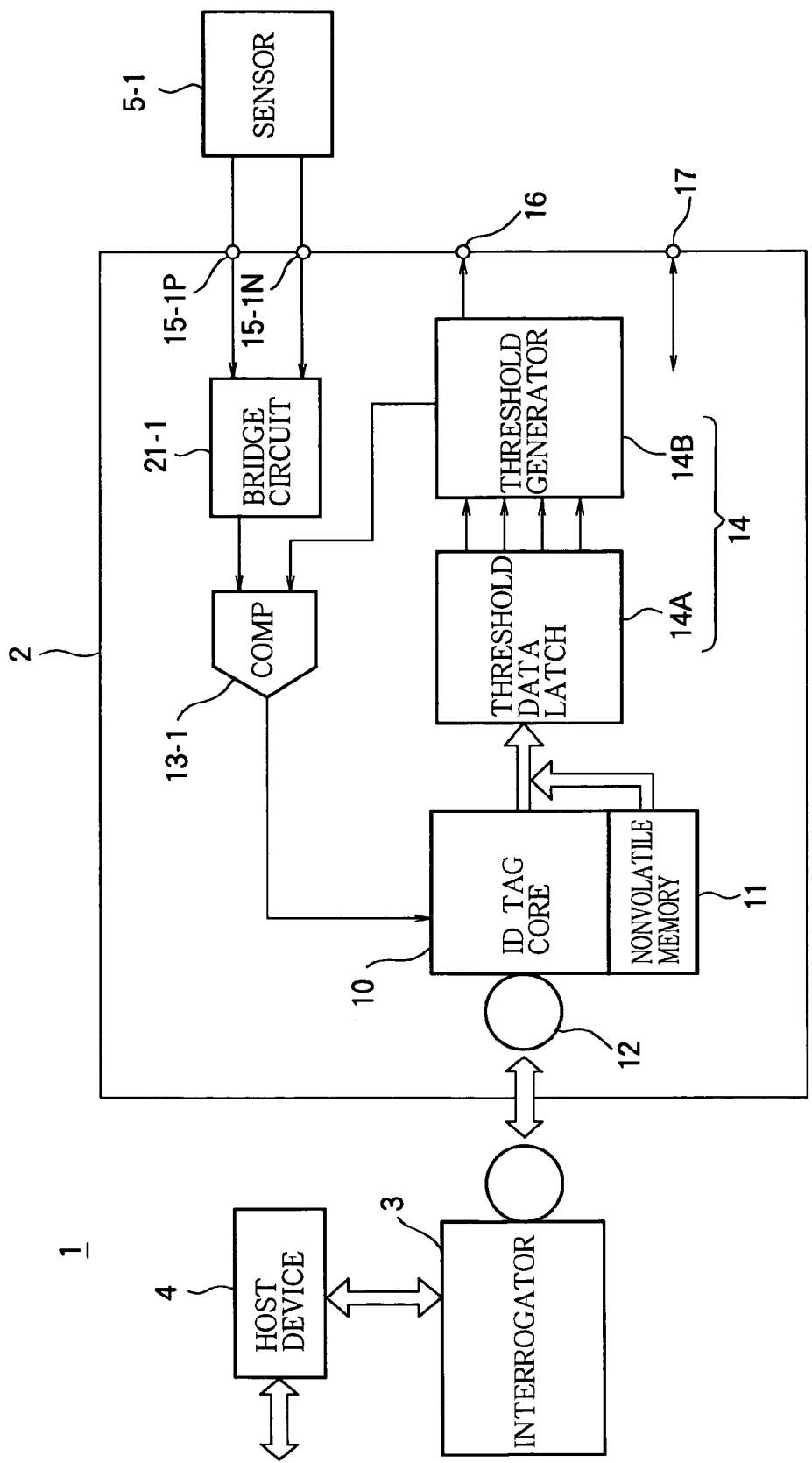
FIG. 6 is a block diagram of a contactless data carrier system according to a third embodiment.

Referring to FIG. 6, the third embodiment is identical to the first embodiment except that each measurement port is connected to an analog sensor through a bridge circuit that expands the dynamic range of the signal received at the measurement port. For simplicity, FIG. 6 shows only one analog comparator 13-1, one bridge circuit 21-1, and one measurement port comprising a pair of input terminals 15-1P and 15-1N. There may of course be more than one analog comparator, more than one bridge circuit, and more than one measurement port.

The third embodiment may also be based on the second embodiment, in which case the bridge circuit is preferably inserted between the analog switch and the common analog comparator, so that only a single bridge circuit is needed.

Figure 7:
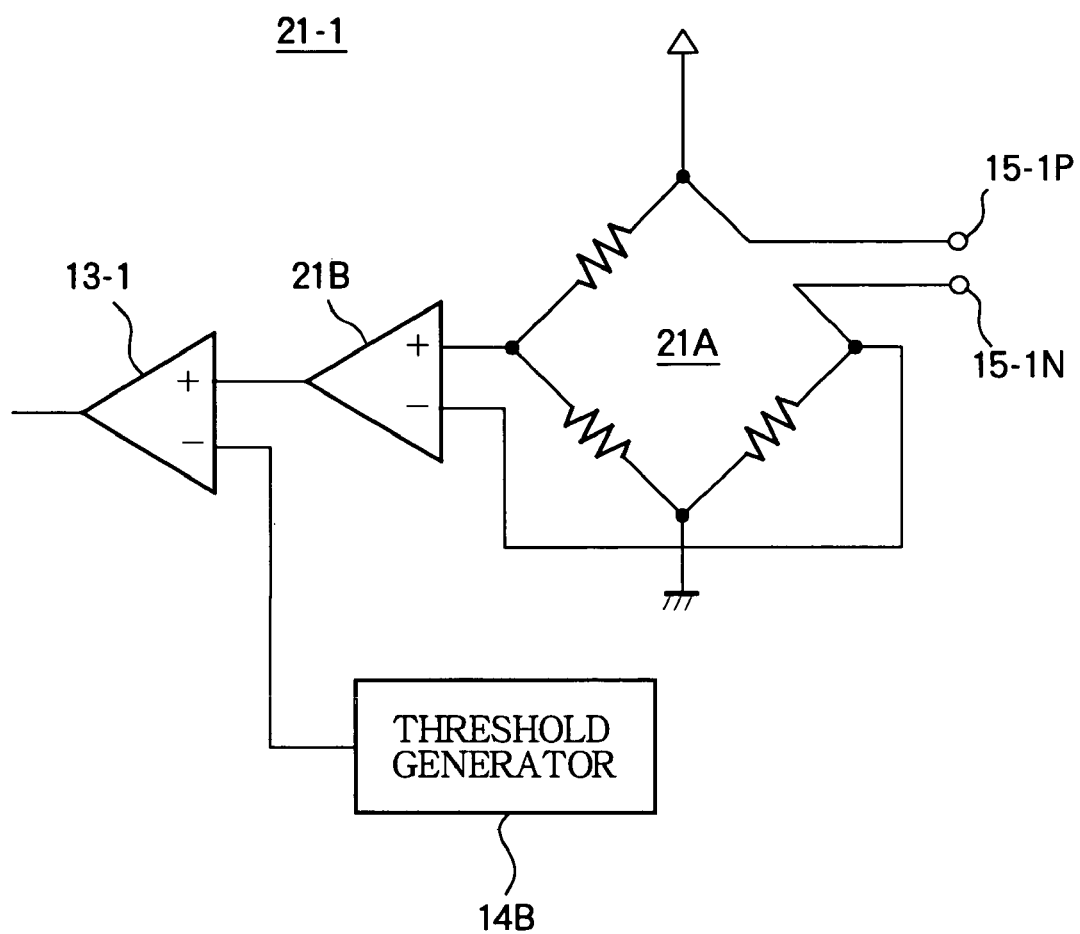
FIG. 7 is a circuit diagram showing the internal structure of the bridge circuit in the third embodiment.

The bridge circuit 21-1 in FIG. 6 has the internal structure shown in FIG. 7, comprising a bridge 21A, one side of which is formed by the internal resistance of the sensor 5-1 connected to the measurement port terminals 15-1P and 15-1N, and a differential amplifier 21B that amplifies the voltage across the two output terminals of the bridge 21A. The output voltage from the differential amplifier 21B is input to the analog comparator 13-1.

The third embodiment produces the same effects as the first embodiment, and has the additional effect of enabling even a weak sensor signal to be detected with high precision.

Fourth Embodiment

Figure 8:
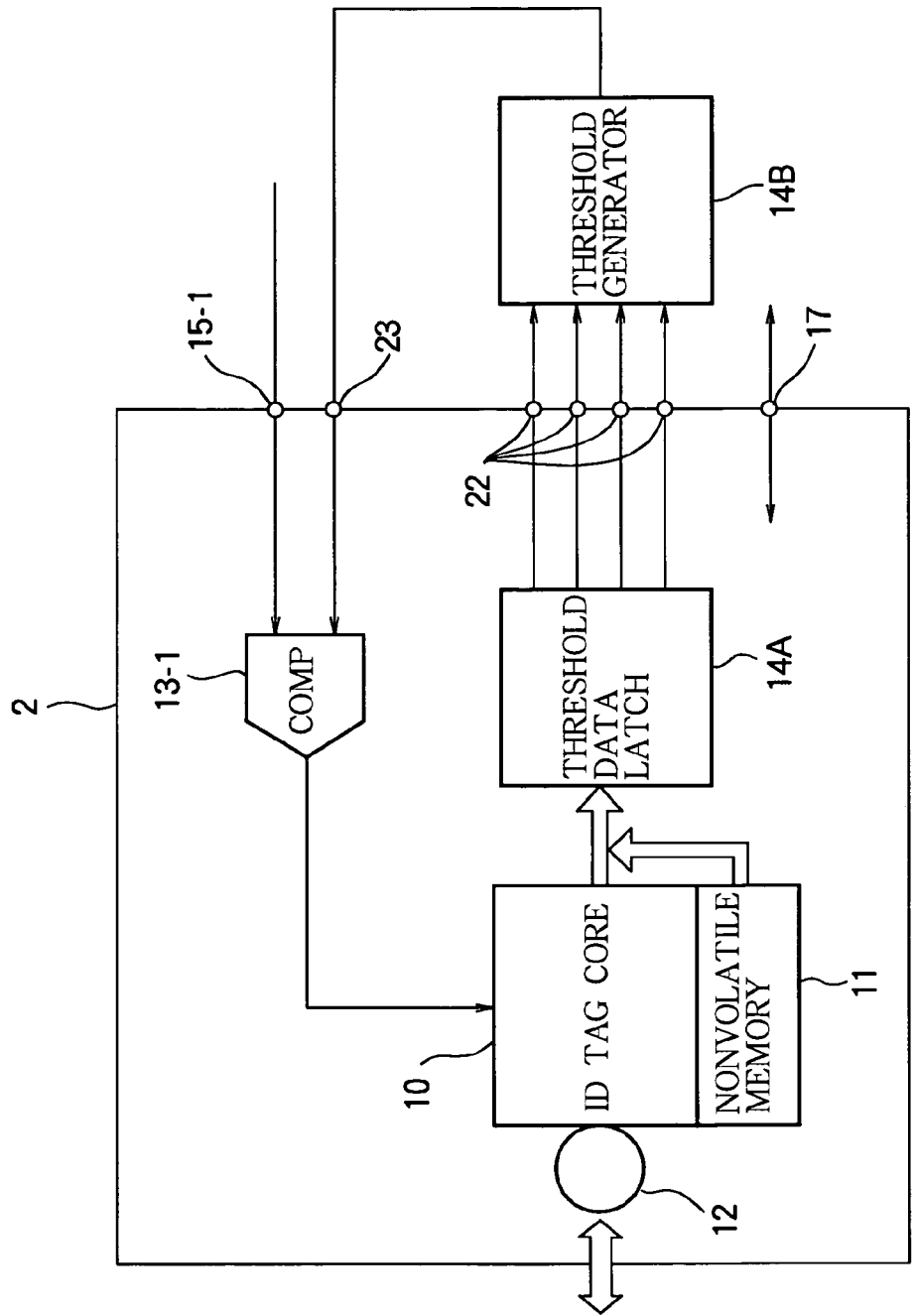
FIG. 8 is a block diagram of a contactless data carrier system according to a fourth embodiment of the invention.

Referring to FIG. 8, the contactless data carrier 2 in the fourth embodiment is identical to the contactless data carrier 2 in the first embodiment, except that the threshold generator 14B is an external component. The contactless data carrier 2 of the fourth embodiment therefore does not have a reference voltage output port 16, but does have output ports 22 for the threshold data and an analog input port 23 for the threshold value (threshold voltage).

FIG. 8 illustrates parallel transfer of the threshold data from the threshold data latch 14A inside the contactless data carrier 2 to the threshold generator 14B outside the contactless data carrier 2, but serial transfer may be used instead, in which case a single output port 22 suffices.

Since the threshold generator 14B is external to the contactless data carrier 2, measurements can be carried out with an arbitrary unit increment between threshold values. For example, two different threshold generators may be provided, one having unit increments of one tenth of a volt (0.1 V) between successive threshold levels, the other having unit increments of two tenths of a volt (0.2 V), and either threshold generator may be connected to the contactless data carrier 2 at the operator's discretion. Alternatively, a single threshold generator 14B may have a string of variable resistors with resistance values that can be adjusted by a common control knob which the operator can turn to select a desired unit increment, or the threshold generator 14B may have a power supply voltage that the operator can adjust to vary the unit increment.

The fourth embodiment produces the same effects as the first embodiment, and has the additional effect of enabling the unit increment (the threshold step width) to be selected.

Fifth Embodiment

Figure 9:
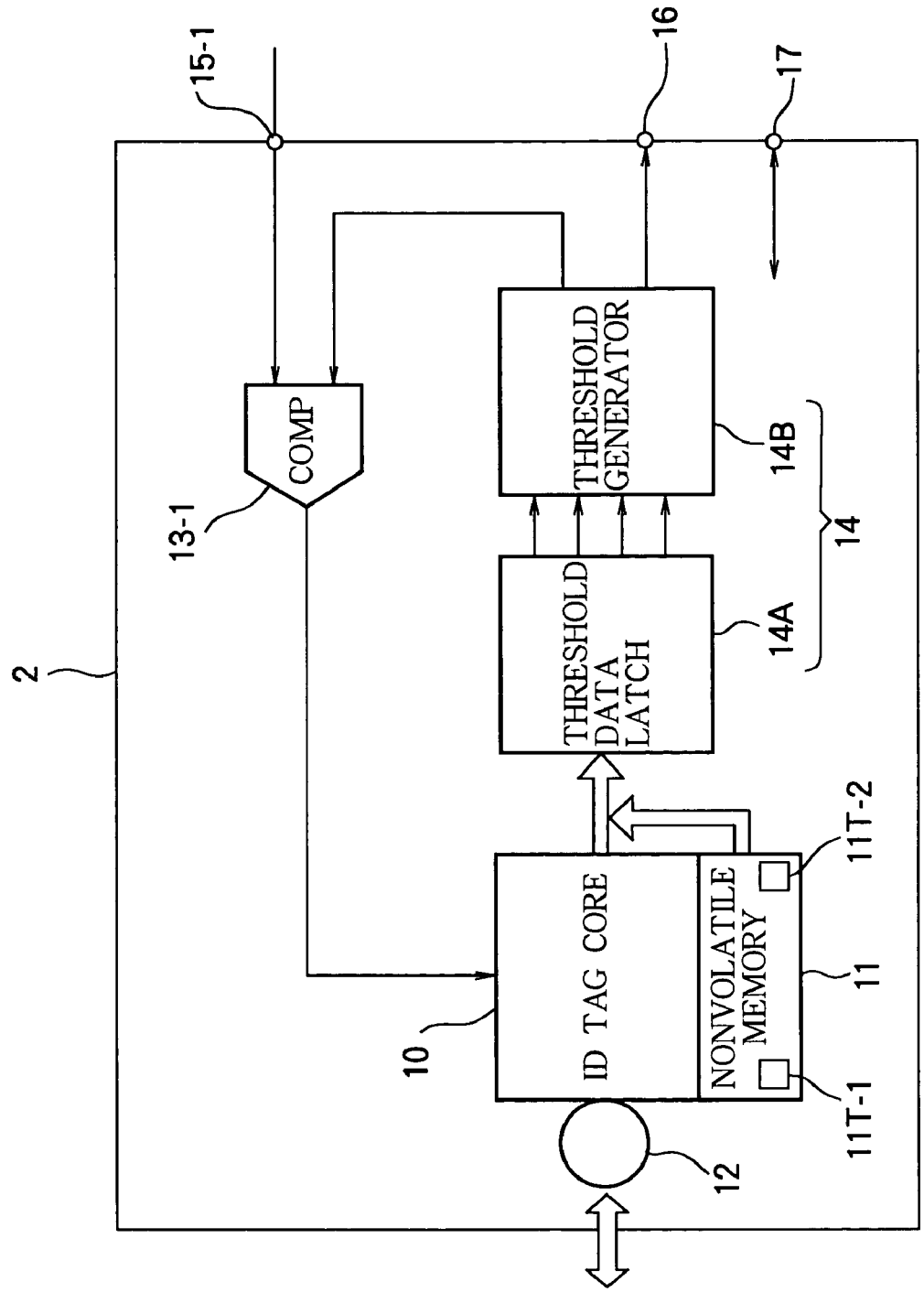
FIG. 9 is a block diagram of a contactless data carrier according to a fifth embodiment.

Referring to FIG. 9, the contactless data carrier 2 in the fifth embodiment is the same as in the first embodiment, except that threshold data correction tables 11T-1, 11T-2 are stored in the nonvolatile memory 11, one table being stored for each measurement port (for simplicity, only one measurement port 15-1 is shown).

The threshold data correction tables 11T-21, 11T-2 are used to correct for nonlinearity of the sensor output signals. In general, the sensor voltage does not increase linearly with the value of the quantity being measured (for example, temperature); the relationship is nonlinear. In the preceding embodiments, this nonlinearity must be compensated for by the host device 4, or in the sensors themselves. In the fifth embodiment, the ID tag core 10 uses the threshold data correction tables 11T-21, 11T-2 to convert threshold data received from the interrogator 3, or generated internally, to threshold data related linearly to the quantity to be measured, and supplies the converted threshold data to the threshold data latch 14A of the variable threshold section 14.

The correction data may be written in the threshold data correction tables 11T-21, 11T-2 through the external input/output terminal 17 when the sensors are connected to the measurement ports, or when the sensors are calibrated.

The fifth embodiment produces the same effects as the first embodiment, and has the additional effect of enabling the contactless data carrier 2 to supply linear measurement data to the interrogator 3, even if the sensor output voltages are nonlinear.

In a variation of the fifth embodiment, the threshold data correction tables are disposed in the interrogator.

Sixth Embodiment

Figure 10:
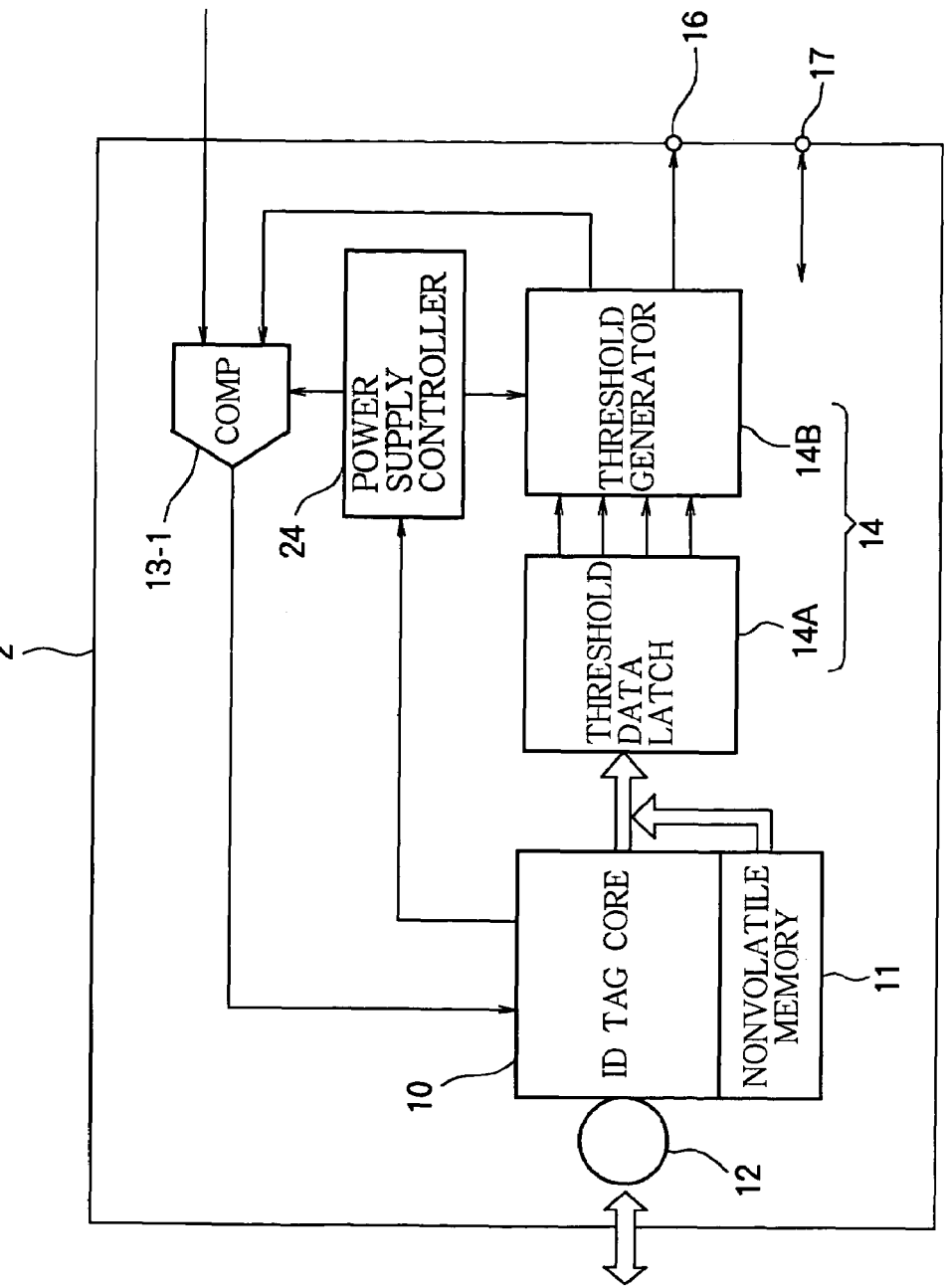
FIG. 10 is a block diagram of a contactless data carrier according to a sixth embodiment.

Referring to FIG. 10, the sixth embodiment differs from the first embodiment in that the contactless data carrier 2 has a power supply controller 24. The power supply controller 24 receives operating power from the power supply unit (not shown) in the ID tag core 10, supplies power to the analog comparators (only one analog comparator 13-1 is shown in FIG. 10) and threshold generator 14B when they are needed in the measurement mode, and shuts their power supplies off when they are not needed. The ID tag core 10 controls the power supply controller 24 according to the interrogation signals received from the interrogator 3. For example, the ID tag core 10 may have the power supply controller 24 turn on the threshold generator 14B when an interrogation signal initiating measurement operations is received, turn each analog comparator on when the interrogator specifies the corresponding measurement port, turn the analog comparator off when the measurement of the measurement port is completed, and turn the threshold generator off when all measurements have been completed.

As a result, during operations other than measurement operations, the analog comparators and threshold generator do not draw current, and the same amount of power is available for communication with the interrogator 3 as if these measurement facilities were not present. In particular, the effective communication range is not shortened when the interrogator 3 interrogates the contactless data carrier 2 simply to confirm the presence of the contactless data carrier 2 or to access data in the nonvolatile memory 11.

The analog comparators and threshold generator draw small amounts of current whenever they are powered, even if no measurements are being performed. Particularly in a contactless data carrier 2 without a built-in battery, which must operate entirely on energy obtained from the signal received by the interrogator 3, this small amount of current can drain enough of the contactless data carrier's power supply to shorten the effective communication range.

The sixth embodiment produces the same effects as the first embodiment, and has the additional effect that the desired communication range (for example, the communication range specified in a standard) can be obtained during non-measurement operations, despite the presence of the measurement facilities.

A similar effect can be obtained during measurement operations if the analog comparators and threshold generator are powered off while the contactless data carrier 2 is transmitting response signals to the interrogator 3.

Seventh Embodiment

Figure 11:
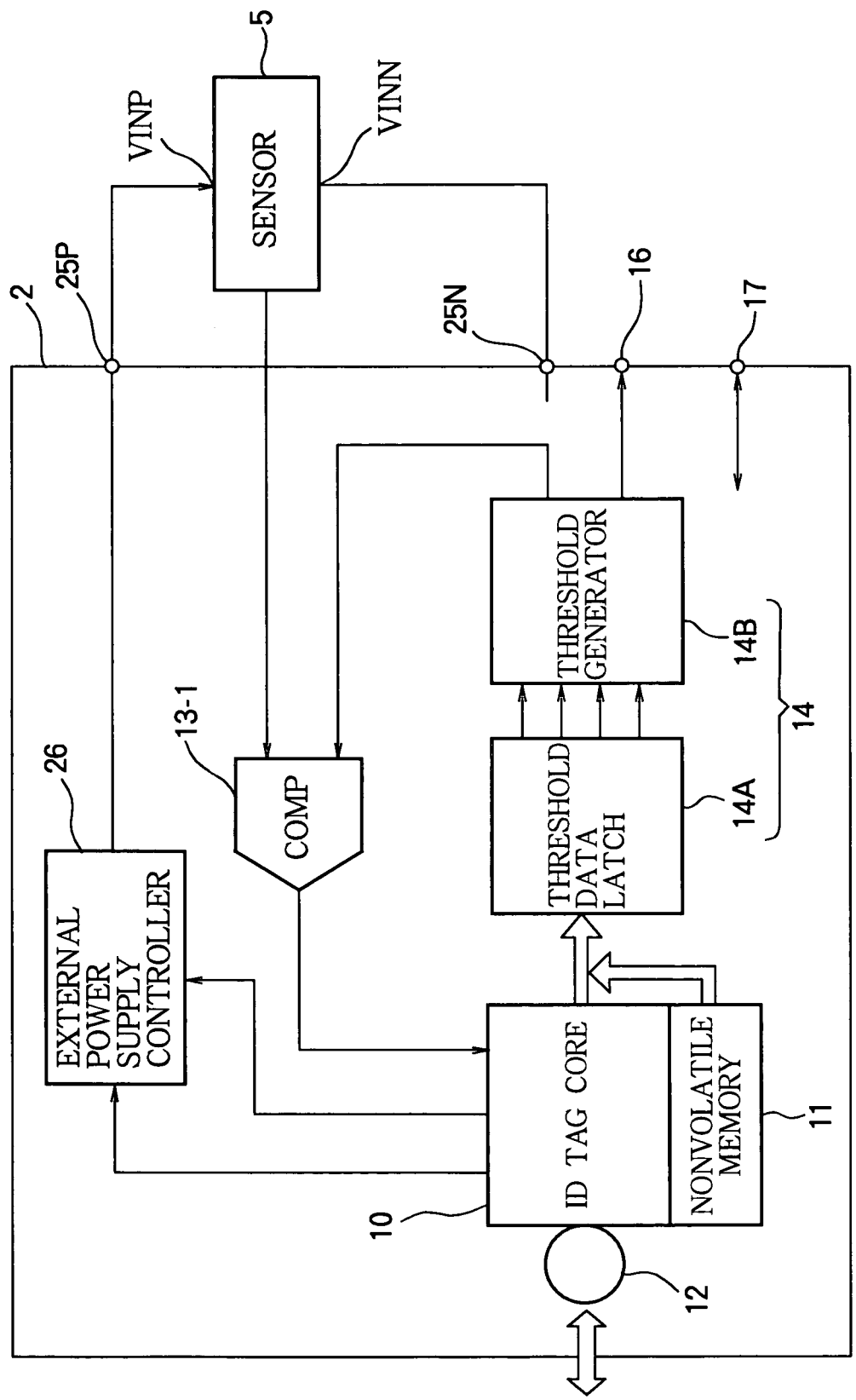
FIG. 11 is a block diagram of a contactless data carrier and sensor according to a seventh embodiment.

Referring to FIG. 11, the seventh embodiment differs from the first embodiment in that the contactless data carrier 2 has a pair of external power supply ports 25P and 25N and an external power supply controller 26.

The external power supply ports 25P and 25N are connected to the power supply input terminals VINP and VINN (VINN is the ground terminal) of a sensor 5 that does not have a built-in power supply, enabling the sensor 5 to receive power from the contactless data carrier 2. The power supply controller 24 receives operating power from the power supply unit (not shown) in the ID tag core 10, and supplies power to the sensor 5 when so directed by a control signal from the ID tag core 10. The ID tag core 10 controls the external power supply controller 26 according to the interrogation signals received from the interrogator 3. For example, the ID tag core 10 may have the power supply controller 24 turn the sensor 5 on only when it is needed to make a measurement.

The seventh embodiment produces the same effects as the first embodiment, and has the additional effect of enabling measurement operations to be performed by a sensor without a built-in power supply (for example a thermistor). A further effect of the seventh embodiment is that the sensor's power can be turned off so that it does not shorten the effective communication range when the sensor is not being used.

Eighth Embodiment

Figure 12:
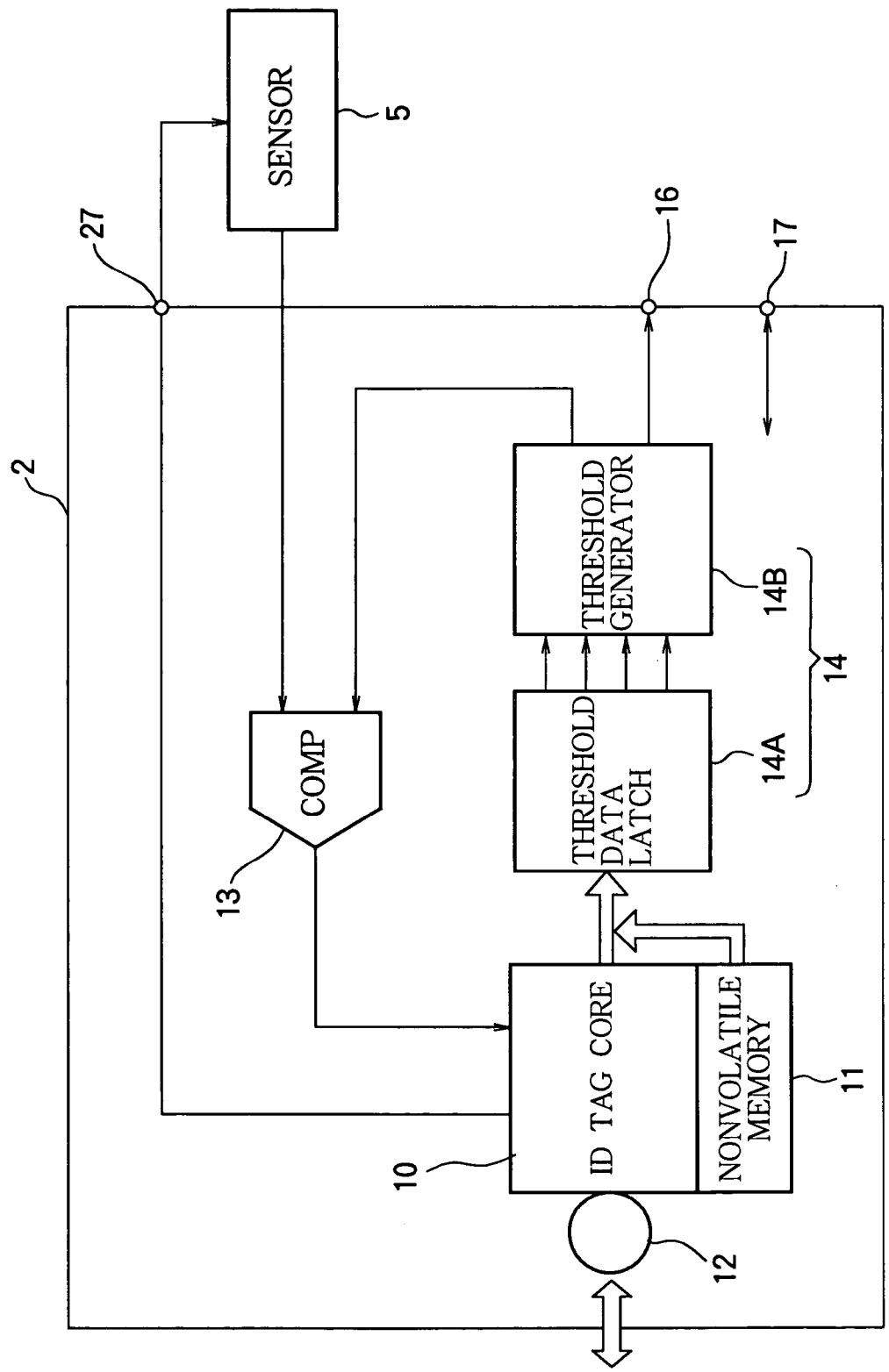
FIG. 12 is a block diagram of a contactless data carrier and sensor according to an eighth embodiment.

Referring to FIG. 12, the eighth embodiment differs from the first embodiment in that the contactless data carrier 2 has an operating command output port 27.

The operating command output port 27 enables the ID tag core 10 to send operating commands to a connected sensor 5. For example, the ID tag core 10 can turn the sensor 5 on and off. The ID tag core 10 may obtain the operating commands directly from interrogation signals received from the interrogator 3, or may generate operating commands in response to interrogation signals specifying, for example, the measurement port.

The operating command output port 27 also provides a convenient way for a human operator of the measurement system to control the sensor 5. For example, if the measurement made with the sensor 5 is carried out according to a regular schedule, the operator can arrange for the host device 4 to send commands through the interrogator 3 and contactless data carrier 2 that turn the sensor 5 on at the scheduled measurement times and off after the measurement is completed. The host device 4 can also be programmed to send a command that turns the sensor 5 on, wait for a suitable interval to let the sensor warm up, and then send another command that starts the measurement.

In a variation of the eighth embodiment, the contactless data carrier 2 has an input port that receives an on-off signal from a device that supplies power to the sensor 5, and the ID tag core 10 turns the sensor 5 on when the on-off signal indicates that the sensor's power supply is turned on.

The eighth embodiment produces the same effects as the first embodiment, and has the additional effect of enabling the interrogator or host device to control the operating status of the sensor through the contactless data carrier.

Ninth Embodiment

Figure 13:
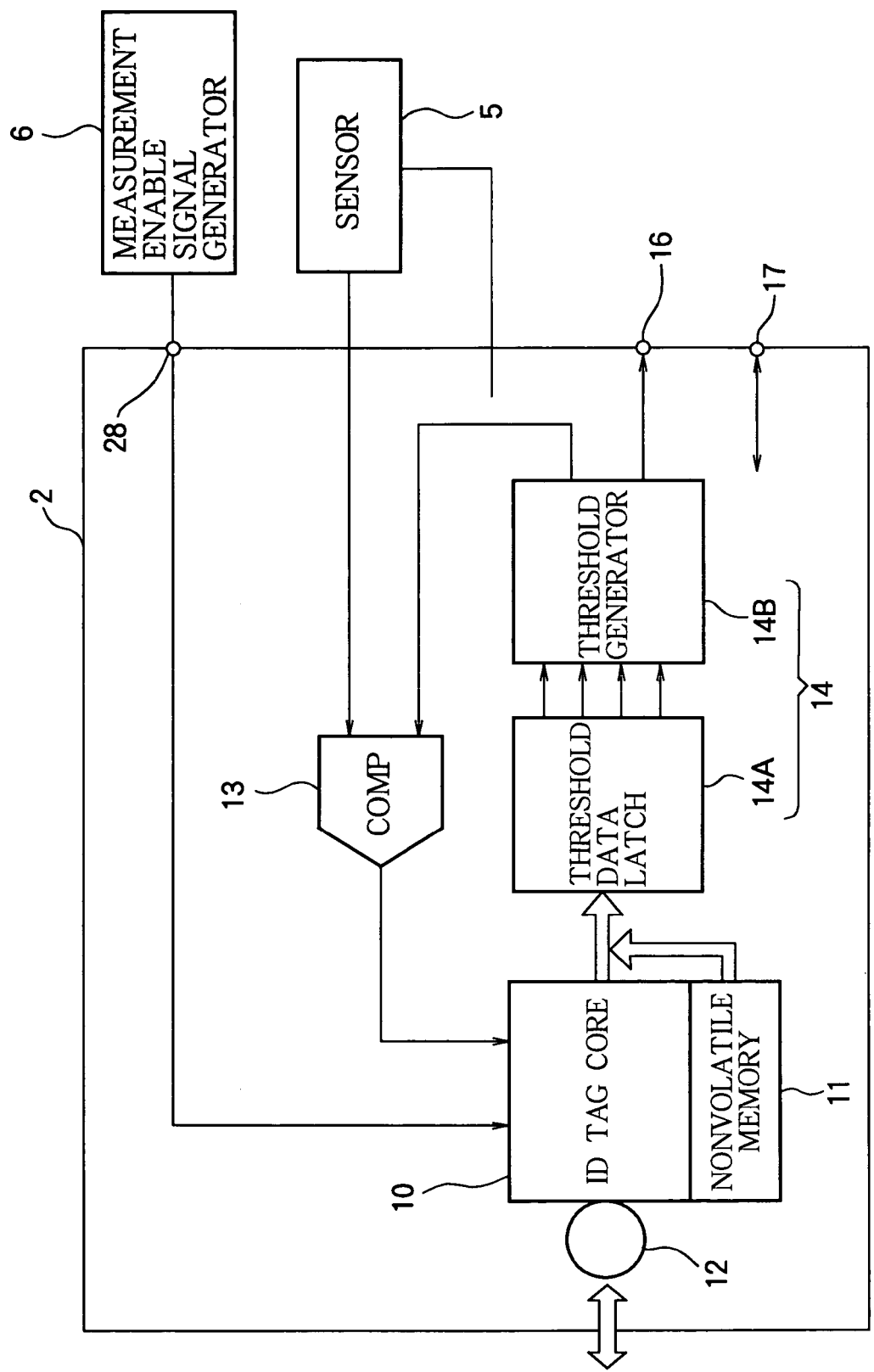
FIG. 13 is a block diagram of a contactless data carrier and sensor according to a ninth embodiment.

Referring to FIG. 13, the ninth embodiment differs from the first embodiment in that the contactless data carrier 2 has a measurement enable signal input port 28 connected to a measurement enable signal generator 6.

The measurement enable signal generator 6 is operated by, for example, a manual toggle switch (not shown), and generates a measurement enable signal with one value (e.g., logic '0') that disables measurement operations and another value (e.g., logic '1') that enables measurement operations. The ID tag core 10 receives the measurement enable signal through the measurement enable signal input port 28.

If the measurement mode enable signal has the enabling value, the ID tag core 10 executes measurement operations when commanded to do so by the interrogator 3. If the measurement mode enable signal has the disabling value, the ID tag core 10 does not execute measurement operations, even if commanded to do so by the interrogator 3.

A timer may be provided on the signal path from the measurement mode enable signal input port 28 to the ID tag core 10 to hold the measurement enable signal received by the ID tag core 10 in the enabling state for at least a predetermined time, even if the measurement mode enable signal received at the input port 28 returns to the disabling state before the predetermined time has expired, to give the ID tag core 10 enough time to complete the measurement process.

The measurement enable signal generator 6 and the sensor 5 need not be separate units. The sensor 5 may have a built-in measurement mode enable signal generator 6 and generate a measurement mode enable signal having the enabling value only when the sensor 5 itself is in a certain state that enables measurements to be made.

The ninth embodiment produces the same effects as the first embodiment, and has the additional effect of allowing measurement operations to be disabled, thereby overriding measurement commands from the interrogator 3, when the conditions necessary for measurement are not present.

Variations

Various modifications of the above embodiments have already been mentioned, but further modifications are possible, such as, for example, the following.

The preceding embodiments can be combined in various ways. When a contactless data carrier has a plurality of measurement ports, different embodiments can be applied to different measurement ports.

The threshold value can be changed by leaving the threshold voltage fixed and changing the direct-current level of the sensor signal input to the analog comparator. In other words, either of the two inputs to the analog comparator can be shifted according to the threshold data.

The first measurement mode, in which the threshold value is increased in unit increments from the minimum value, can be used in all measurement operations.

The threshold value can be decreased in unit increments instead of being increased.

The threshold value can be increased and decreased by increments that shrink by successive factors of two, using the well-known binary search technique. In this technique, if the total number of threshold values is N, the initial threshold value is set to the N/2-th value from the minimum value. If the comparison result is '0', then for the next comparison, the threshold is set to the N/4-th value from the minimum value; if the comparison result is '1', then for the next comparison the threshold is set to the 3N/4-th value from the minimum value. The search continues in this way until the two threshold values at which the logic of the comparison result changes are identified, the search range being narrowed by half at each step according to the previous comparison result.

The threshold data in the first measurement mode can be specified by the host device, or by the contactless data carrier itself, instead of by the interrogator. Similarly, the threshold data in the second measurement mode can be specified by the interrogator or the host device instead of by the contactless data carrier.

The threshold voltage may be generated by a type of low-pass filter that gradually charges a capacitor, and the time from the start of charging to the point at which the sensor signal exceeds the threshold voltage may be measured with a timer in the ID tag core. The measured time is then returned to the interrogator as a parameter representing the measurement value.

As mentioned in the first embodiment, instead of sending the actual threshold data in the first measurement mode, the interrogator may send an equivalent code that the ID tag core converts to the desired threshold data, using a code/data conversion table stored in the non-volatile memory. If this code scheme is used, then in the second measurement mode, instead of returning the boundary threshold data to the interrogator, the ID tag core may return the equivalent code.

Instead of being powered by energy in the signal received from the interrogator, the contactless data carrier may have a chemical or solar battery.

Information may be transferred between the interrogator and the contactless data carrier by either inductive coupling or microwave transmission. If the contactless data carrier is battery-powered, optical communication is also an option.

The analog comparator may be a window comparator that determines whether the sensor signal falls in a range between two specified threshold values.

More generally, the sensor signal from a measurement port may be input to a plurality of analog comparators and compared simultaneously with a plurality of threshold values. If two analog comparators are used, they may compare the sensor signal with two consecutive threshold values, speeding up the measurement process by a factor of two. Alternatively, a ternary search scheme may be used in which the search range is narrowed by a factor of three at each successive comparison.

The sensor may provide digital output, and a digital comparator may be used instead of an analog comparator. In this case, the digital comparator may output a comparison result indicating whether the sensor output data and the threshold data match exactly or not. For example, the digital comparator may comprise an exclusive-OR gate for each data bit, and an OR gate that receives the outputs from all the exclusive-OR gates.

The contactless data carrier may include any number of semiconductor chips, and each semiconductor chip may include any of the constituent elements of the contactless data carrier.

When one interrogator takes measurements from a plurality of contactless data carriers, the measurement procedure may be modified to follow steps 1 to 4 below.

Step 1: The interrogator broadcasts an interrogation signal specifying the first measurement mode to all the contactless data carriers.

Step 2: The interrogator broadcasts further interrogation signals specifying successively increasing or decreasing threshold data to all the contactless data carriers.

Step 3: In each contactless data carrier, the ID tag core checks the comparison result from the analog comparator each time new threshold data are provided, and stores the threshold data at which the comparison result changes. Once the comparison result has changed, the contactless data carrier stops performing comparisons even if the interrogator broadcasts further threshold data.

Step 4: After sending the maximum threshold data, the interrogator polls the contactless data carriers one by one and acquires the threshold data at which the comparison result changed in each contactless data carrier.

The functions performed by the interrogator and host device may be divided between these two devices in any convenient way. The interrogator may also be integrated into the host device, in which case the host device itself may be referred to as the interrogator. The term 'interrogator' refers generally to any device or group of devices that interrogate and control a contactless data carrier.

Those skilled in the art will recognize that further variations are possible within the scope of the invention, which is defined in the appended claims.

What is claimed is:

1. A contactless data carrier system comprising a contactless data carrier, a signal source, and an interrogator wherein:
   the signal source generates an external signal according to an ambient physical quantity;
   the contactless data carrier includes a measurement port for receiving the external signal, a variable threshold generator for generating different threshold values, a comparator for comparing the external signal received at the measurement port with the different threshold values and for producing comparison results, and a controller for controlling the variable threshold generator according to commands received from the interrogator and for returning the comparison results to the interrogator; and
   the interrogator exchanges data with the contactless data carrier by wireless communication, commands the controller in the contactless data carrier to have the comparator execute repeated comparisons, supplies the different threshold values to the contactless data carrier, obtains individual comparison results from the contactless data carrier, and obtains information about the ambient physical quantity by finding a boundary value at which the comparison results change.

2. The contactless data carrier system of claim 1, wherein one interrogator communicates with a plurality of contactless data carriers.

3. An interrogator controlling a contactless data carrier connected to a signal source that generates an external signal according to an ambient physical quantity, the contactless data carrier including a measurement port for receiving the external signal, a variable threshold generator for generating different threshold values, a comparator for comparing the external signal received at the measurement port with the different threshold values and for producing comparison results, and a controller for controlling the variable threshold generator according to commands received from the interrogator and for returning the comparison results to the interrogator, wherein:
   the interrogator commands the controller in the contactless data carrier to have the comparator execute repeated comparisons with different threshold values, and obtains information about the ambient physical quantity by finding a boundary value at which the comparison results change; and
   the interrogator supplies the different threshold values to the contactless data carrier.

4. The interrogator of claim 3, wherein the interrogator determines the initial threshold value used in the repeated comparisons from a threshold value at which the comparison result changed in a previous series of repeated comparisons.

5. The interrogator of claim 3, wherein the interrogator controls a plurality of contactless data carriers.

6. A method of acquiring data from a contactless data carrier connected to a signal source that generates an external signal according to an ambient physical quantity, the contactless data carrier including a measurement port for receiving the external signal, a variable threshold generator for generating different threshold values, a comparator for comparing the external signal received at the measurement port with the different threshold values and producing comparison results, and a controller for controlling the variable threshold generator according to commands received from the interrogator and returning the comparison results to the interrogator, the interrogator exchanging data with the contactless data carrier by wireless communication, the method comprising:
   sending, from the interrogator, the controller in the contactless data carrier a command to have the comparator execute repeated comparisons with different threshold values;
   sending, from the interrogator, the different threshold values to the contactless data carrier;
   receiving, by means of the interrogator, each of the comparison results from the contactless data carrier; and
   obtaining, by means of the interrogator, information about the ambient physical quantity by finding a boundary value at which the comparison results change.

7. The method of claim 6, further comprising:
   using, by means of the interrogator, the boundary threshold value to determine an initial threshold value; and
   sending, from the interrogator, the contactless data carrier another command to have the comparator execute repeated comparisons with different threshold values, the repeated comparisons starting from the initial threshold value.

8. The method of claim 6, wherein the method is applied simultaneously to a plurality of contactless data carriers.

9. A machine-readable medium storing code executable by a computing device for acquiring data from the contactless data carrier of that exchanges data by wireless communication with an interrogator, the contactless data carrier comprising:
   a measurement port for receiving an external signal to be compared, from a signal source that generates the external signal according to an ambient physical quantity;
   a variable threshold generator for generating different threshold values;
   a comparator for comparing the external signal received at the measurement port with the different threshold values and for producing comparison results; and
   a controller for receiving signals specifying the different threshold values from the interrogator, for controlling the variable threshold generator according to the signals received from the interrogator, and for returning each of the comparison results to the interrogator, the code comprising:
   a first program, installable in the interrogator, for sending, from the interrogator, the controller in the contactless data carrier a command to have the comparator execute the repeated comparisons with different threshold values, sending, from the interrogator, the contactless data carrier the different threshold values, receiving, by means of the interrogator, individual results of the comparisons from the contactless data carrier, and obtaining, by means of the interrogator, information about the ambient physical quantity by finding a boundary threshold value at which the results of the comparisons change; and a second program installable in the contactless data carrier, for controlling, by means of the controller, the comparator according to commands received from the interrogator, executing said command to have the comparator execute repeated comparisons with different threshold values, and returning, from the contactless data carrier, the comparison results to the interrogator.

* * * * *

UNITED STATES PATENT AND TRADEMARK OFFICE
CERTIFICATE OF CORRECTION

PATENT NO. : 7,604,177 B2  Page 1 of 1
APPLICATION NO. : 11/127107
DATED : October 20, 2009
INVENTOR(S) : Konuma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 925 days.

Signed and Sealed this

Fourteenth Day of December, 2010

David J. Kappos
*Director of the United States Patent and Trademark Office*